(12) United States Patent
Duval et al.

(10) Patent No.: US 6,183,583 B1
(45) Date of Patent: Feb. 6, 2001

(54) METHOD OF MANUFACTURING CARBON-CARBON COMPOSITE BRAKE DISKS

(75) Inventors: Renaud Duval, Les Cheres; Eric Lherm, Rigneux-le-Franc, both of (FR)

(73) Assignee: Messier-Bugatti, Villacoublay (FR)

(*) Notice: Under 35 U.S.C. 154(b), the term of this patent shall be extended for 0 days.

(21) Appl. No.: 09/125,148

(22) PCT Filed: Dec. 17, 1997

(86) PCT No.: PCT/FR97/02323

§ 371 Date: Aug. 12, 1998

§ 102(e) Date: Aug. 12, 1998

(87) PCT Pub. No.: WO98/27026

PCT Pub. Date: Jun. 25, 1998

(30) Foreign Application Priority Data

Dec. 17, 1996 (FR) .................................................. 96/15487

(51) Int. Cl.⁷ .............................. C04B 35/83; F16D 69/02
(52) U.S. Cl. .......................... 156/148; 156/189; 156/195; 28/107; 28/113; 28/110
(58) Field of Search .................. 156/148, 189, 156/195; 28/110, 107, 113

(56) References Cited

U.S. PATENT DOCUMENTS

| | | | |
|---|---|---|---|
| 3,402,085 | * 9/1968 | Trimble | 156/189 |
| 4,790,052 | * 12/1988 | Olry | 28/110 |
| 5,599,603 | * 2/1997 | Evans et al. | 428/66.2 |
| 5,662,855 | * 9/1997 | Liew et al. | 156/195 X |
| 5,664,305 | * 9/1997 | Lawton et al. | 28/113 |
| 5,871,844 | * 2/1999 | Theys et al. | 428/408 X |

FOREIGN PATENT DOCUMENTS

| | | | |
|---|---|---|---|
| 2196966 | * | 3/1974 | (FR) . |
| WO 9101397 | * | 2/1991 | (WO) . |
| WO 9201648 | * | 2/1992 | (WO) . |

* cited by examiner

Primary Examiner—Jeff H. Aftergut
(74) Attorney, Agent, or Firm—Weingarten, Schurgin, Gagnebin & Hayes LLP

(57) ABSTRACT

A three-dimensional fiber structure is formed by superposing layers of felt and by bonding them together by needling, then the structure is compressed to obtain a preform having a fiber volume fraction of not less than 20%. The preform is held in its compressed state by being impregnated with a liquid composition containing a bonding agent capable of bonding the fibers of the preform together. Thereafter, the preform consolidated in this way is densified, e.g. by chemical vapor infiltration.

29 Claims, 6 Drawing Sheets

METHOD OF MANUFACTURING CARBON-CARBON COMPOSITE BRAKE DISKS

FIELD OF THE INVENTION

The present invention relates to manufacturing parts made of carbon—carbon composite material (C—C), in particular to manufacturing brake disks.

BACKGROUND OF THE INVENTION

Parts made of C—C composite material are manufactured by making a fiber preform of a shape that is close to that of the part to be manufactured and by densifying the preform by inserting a matrix into the pores of the preform.

The preform is made from a base fiber fabric, for example by winding a strip of base fabric in superposed layers or by stacking or laying plies of base fabric. By way of example, the base fiber fabric may be a felt, a woven cloth, a knit, a braid, a unidirectional sheet of yarns, tows, or strands, or indeed a multilayer fabric made up of a plurality of superposed unidirectional sheets having different directions and bonded to one another by light needling.

Document GB-A-1 447 029 describes making such a multilayer base fiber fabric. The various needled-together layers can be impregnated with a thermoplastic resin and compressed in order to obtain a consolidated fiber fabric suitable subsequently for making composite materials.

The preform can be densified with a carbon matrix by chemical vapor infiltration and/or by a liquid technique. Chemical vapor infiltration consists in placing the preform in an enclosure into which there is inserted a gas containing one or more gaseous precursors of carbon. These are typically selected from alkanes, alkyls, and alkenes, with commonly used precursors being methane and/or propane. The conditions of temperature and pressure inside the enclosure are determined so as to enable the gas to diffuse into the pores of the preform and to form a deposit of pyrolytic carbon on the fibers by decomposition of the carbon precursor(s) it contains. The liquid technique consists in impregnating the preform with a composition containing a carbon precursor in the liquid state, e.g. pitch or a resin having a non-zero coke content. The precursor is transformed by heat treatment that gives rise to coke. Thus, for example, document WO-A-92/01648 describes a method of manufacturing C—C brake disks which consists in associating plies of fiber fabric with a polymerizable carbon precursor and in performing heat treatment, at least in an initial stage, under pressure so as to consolidate the preform and transform the precursor, thereby obtaining the desired C—C material.

Nevertheless, to ensure cohesion of the preform and the ability of the manufactured part to withstand delamination, it is desirable to bond together the layers or plies constituting it. Such bonding is advantageously performed by needling, as described for example in documents U.S. Pat. No. 4,790,052, FR-A-2 626 294, and FR-A-2 726 013.

Another method, described in document WO-A-91/01397 consists in forming a fiber structure, e.g. by stacking plies, in compressing the fiber structure so as to obtain a preform of a shape that is close to the shape of a part to be manufactured, and in maintaining the preform in the compressed state by a series of needling operations performed from both sides of the preform over its entire thickness, or by stitching using a thread passing through the preform.

Yet another method, as described in document FR-A-2 619 104, consists in performing three-dimensional impregnation by superposing and needling together plies of fiber fabric that is impregnated with a composition comprising a carbon-precursor resin. The pre-impregnated piece is then shaped under pressure and subjected to heat treatment to carbonize the precursor and obtain a carbon matrix composite.

To manufacture disk brakes out of C—C composite material, annular fiber preforms are generally made by needling plies of a base fiber fabric comprising a woven cloth or a laminate comprising a plurality of unidirectional sheets of yarns, tows, or strands, optionally associated with a fiber web or a felt. The plies are needled one at a time so as to obtain needling of a predetermined density in the thickness of the preform. The preforms are usually densified by chemical vapor infiltration, with the needled preforms having sufficient mechanical strength to avoid the need to use support tooling.

Brake disks made in this way are used for aircraft disk brakes or for the brakes of F1 racing cars where they give entire satisfaction.

In other applications such as braking rail vehicles, industrial vehicles, or private cars, where conditions of use are generally much less severe, tests performed by the Applicant using the same disks have not been so satisfactory. In particular, there have been observed the appearance of undesirable vibration, of irregularities in braking torque, and sometimes of wear greater than that which could have been hoped for. In addition, manufacturing costs are high and difficult to make compatible with generalized use on rail vehicles or on industrial vehicles or on mass-produced cars.

An object of the present invention is to remedy those drawbacks and, in most general terms, it proposes a method that is suitable particularly, but not exclusively, for manufacturing brake disks for various applications.

In particular, an object of the invention is to provide a method enabling brake disks made of C—C composite material to be obtained that present good mechanical and tribological properties and that are suitable for being used under various conditions without generating undesirable vibration and without presenting unacceptable wear.

BRIEF DESCRIPTION OF THE INVENTION

This object is achieved by a method of manufacturing a part made of carbon—carbon composite material, the method comprising forming a three-dimensional fiber structure, compressing the fiber structure to obtain a fiber preform of shape close to that of the part to be manufactured, holding the preform in its compressed state, and densifying the preform, in which method, according to the invention:

the three-dimensional fiber structure is formed by superposing layers of felt and by bonding them together by needling; then the fiber structure is compressed so as to obtain a preform having a fiber volume fraction of not less than 20%; and the preform is held in its compressed state by consolidation after impregnating it with a liquid composition containing a bonding agent capable of bonding together the fibers of the preform.

Preferably, the three-dimensional fiber structure is formed by superposing and needling felt layers having a fiber volume fraction lying in the range 7% to 15% and made of fibers having a mean length lying in the range 10 mm to 100 mm.

The layers of felt are advantageously needled one by one as they are superposed. Preferably, the number of needle strokes per unit area, and also the penetration depth of the needles into the fiber structure being built up are controlled so as to obtain a predetermined density of needling in the thickness of the fiber structure, advantageously a density of needling per unit volume that is constant and that confers a quasi-isotropic character to the fiber structure.

The preform is advantageously held in the compressed state by injecting the liquid composition containing the bonding agent into the inside of tooling in which the preform is compressed, with it being possible to perform injection before or after compression.

By way of example, the bonding agent may be a resin, preferably a resin having a non-zero coke content, which resin is carbonized by heat treatment performed on the preform before it is densified by chemical vapor infiltration.

When applied to manufacturing annular brake disks of C—C composite material, the method makes it possible to obtain products having the required mechanical and tribological qualities, and tests performed by the Applicant show that the braking torque is stable and that wear is low under various conditions of use. In addition, the appearance of undesirable vibration is not observed. This may be explained by the fact that making fiber reinforcement out of a felt gives the resulting product less transverse stiffness than when the reinforcement has two-dimensional woven plies or superposed unidirectional sheets. The probability of irregular wear of the rubbing faces, which constitutes a source of vibration, is thus reduced.

An annular part made of C—C composite is manufactured from an annular three-dimensional fiber structure. This can be formed by winding a strip of felt in superposed layers that are bonded together by needling, e.g. by helically winding flat turns of a strip of deformable felt or by winding a strip of felt in superposed layers on a cylindrical mandrel. In a variant, the annular structure may be formed by stacking plies of felt while flat and bonding them together by needling. The plies may be full, in which case the annular structure is obtained by cutting out the stacked and needled plies. It is also possible to start from annular plies that have been cut out previously.

The felt used for implementing the method of the invention is preferably made of carbon fibers. It could be made of fibers that are a precursor of carbon, in which case the carbon precursor is transformed by heat treatment applied to the preform in the needled state, or even in the compressed state. Suitable carbon or carbon-percursor fibers are fibers based on pre-oxidized polyacrylonitrile, phenol-based fibers, cellulose-based fibers, pitch-based fibers, etc.

It is possible to use felts made of different kinds of fiber for different portions of the fiber structure. Thus, when manufacturing brake disks, it is possible for the portion of the structure which corresponds to the core of the disk to use a felt made of carbon or carbon-percursor fibers based on pre-oxidized polyacrylonitrile (PAN) or based on anisotropic pitch, and for the, or each, portion of the structure that corresponds to a friction portion of the disk to use a felt made at least in part of carbon or carbon-precursor fibers that are phenol-based, or cellulose-based, or based on isotropic pitch. Carbon fibers based on pre-oxidized PAN or on anisotropic pitch are high-strength fibers, while carbon fibers based on phenol, cellulose, or isotropic pitch are low-modulus fibers. The use of low-modulus fibers either on their own or mixed with high-strength fibers in the friction face(s) of a disk contributes to further reducing its transverse stiffness and to opposing irregular wear which constitutes a source of vibration.

BRIEF DESCRIPTION OF THE DRAWINGS

Implementations of the method of the invention are described below by way of non-limiting indication. Reference is made to the accompanying drawings, in which.

DETAILED DESCRIPTION OF PREFERRED EMBODIMENTS

In the description below, consideration is given to the manufacture of brake disks out of C—C composite, but it should be understood that the method of the invention is applicable to manufacturing other parts made of C—C composite that are not necessarily annular in shape, as will be immediately apparent to the person skilled in the art.

Figure 1:
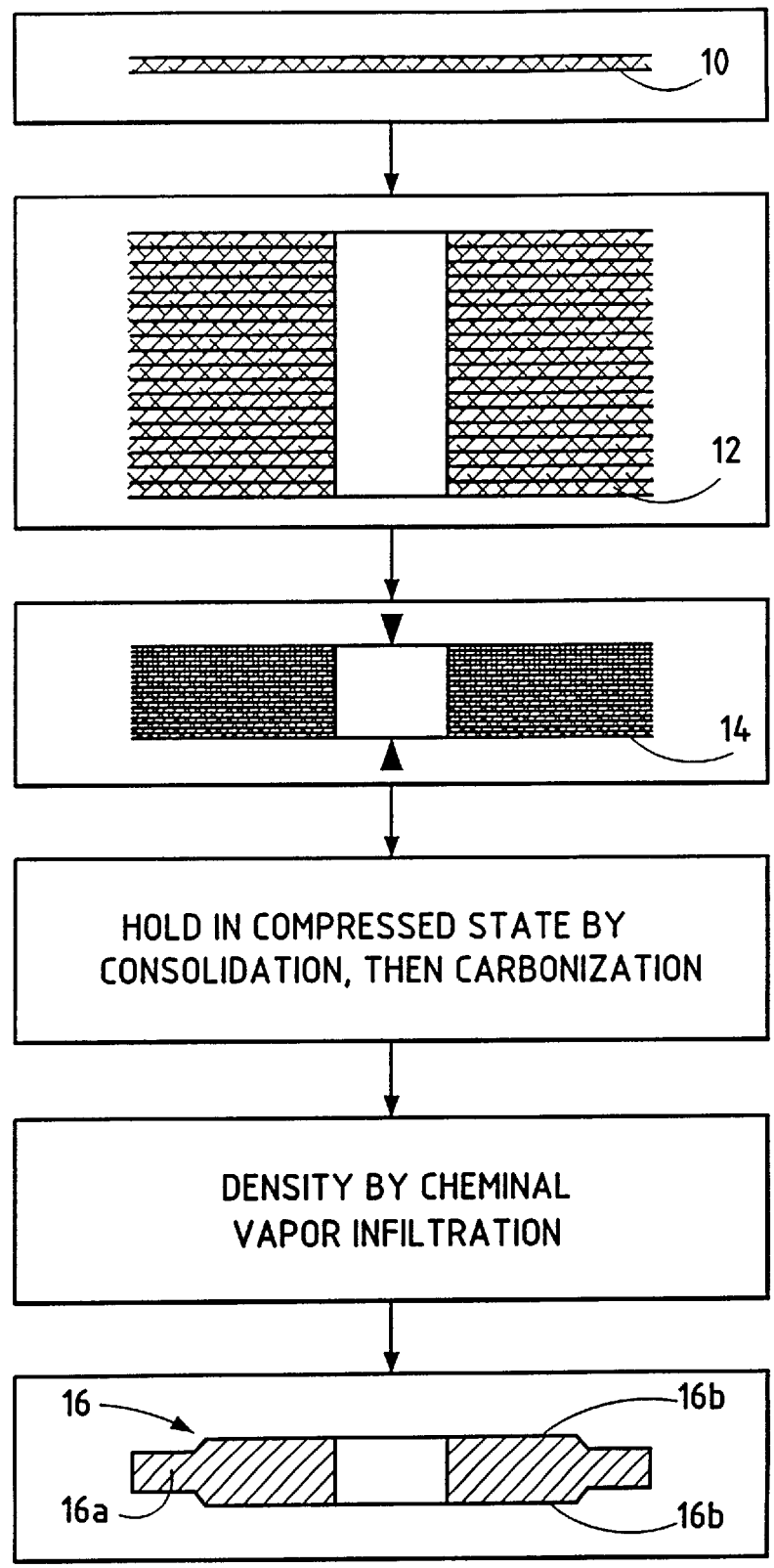
FIG. 1 shows the successive steps of implementing a method of the invention.

The various steps in manufacturing a C—C composite brake disk in a first implementation of a method of the invention are essentially as follows (FIG. 1):

supplying a basic fiber fabric in the form of a felt 10 made of carbon or carbon precursor fibers;

supplying a three-dimensional fiber structure 12 by superposing and needling layers of felt 10;

compressing the structure 12 to obtain a preform 14 of a shape that is close to that of the brake disk to be made;

holding the preform 14 in the compressed state by consolidation after it has been impregnated with a liquid composition containing a bonding agent;

densifying the preform 14, e.g. at least in part by chemical vapor infiltration, or some other densification technique; and machining the densified preform to obtain the desired brake disk 16.

Impregnation by means of the liquid composition containing a bonding agent can be performed before or after the fiber structure has been compressed.

The felt 10 is made in conventional manner from relatively short carbon fibers, i.e. fibers that preferably have a mean length lying in the range 10 mm to 100 mm. The felt obtained in this way has a fiber volume fraction lying in the range approximately 7% to 15%, where the fiber volume fraction is the fraction of the apparent volume of the felt that is actually occupied by the fibers, which corresponds to a density lying in the range approximately 100 kg/m$^3$ to 200 kg/m$^3$.

The fibers used are carbon fibers obtained by carbonizing carbon-precursor fibers, or carbon-precursor fibers that have not yet been carbonized. In both cases, suitable carbon precursor fibers are fibers of pre-oxidized polyacrylonitrile, phenol fibers, cellulose fibers, pitch fibers, etc. Several different precursors can be used for a single felt. In particular, it is possible to associate fibers having a pre-oxidized polyacrylontrile precursor and/or an anisotropic pitch precursor which carbonize to give high-strength carbon fibers with fibers having a phenol precursor and/or a cellulose precursor and/or an isotropic pitch precursor which carbonize to give low-modulus carbon fibers.

Depending on the selected method of forming the fiber structure, the felt 10 may be presented in various forms, such as a continuous strip of greater or lesser width, full plies, or precut annular plies.

Various methods can be used for forming the annular three-dimensional fiber structure, all of which comprise superposing and needling a plurality of layers of felt, the number of layers being selected as a function of the stiffness and the fiber volume fraction desired for the preform after compression.

Figure 2A:
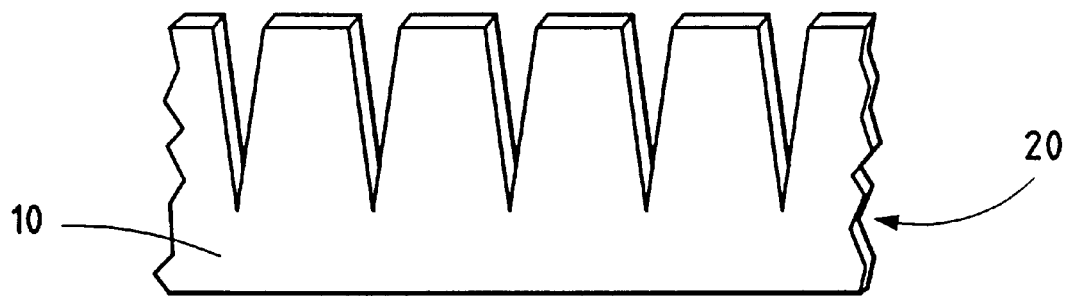
FIGS. 2A and 2B show how an annular three-dimensional fiber structure is formed in a first implementation of the invention.
Figure 2B:
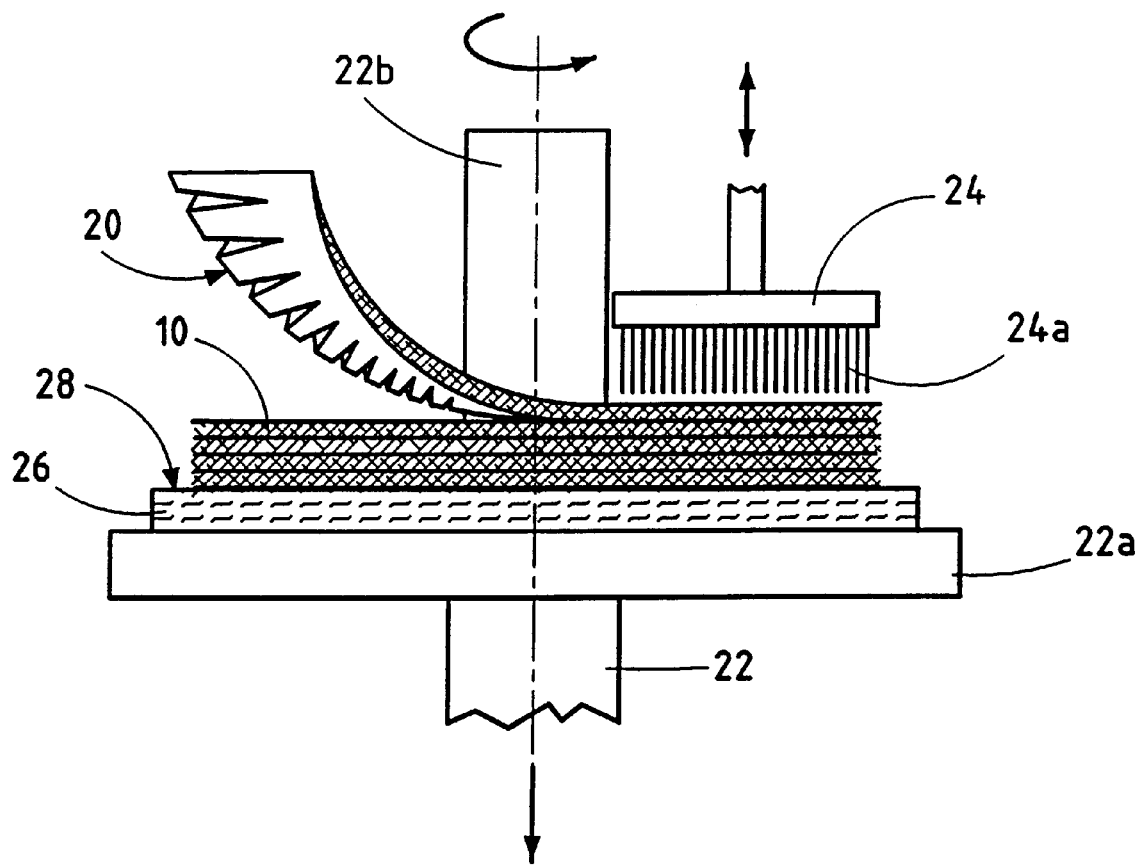

In the implementation of FIGS. 2A and 2B, the structure is formed by helically winding flat superposed turns of a deformable strip or tape 20 of felt 10. The strip 20 is made to be deformable so that it can be wound flat without giving rise to significant extra thicknesses at the inside circumference of the structure. To this end, substantially V-shaped notches 20a are formed from the side of the strip 20 that is to form the inside circumference, with the notches extending over the greater part of the width of the strip (FIG. 2A).

The strip 20 is preferably needled progressively as it is being wound so that each turn is needled to the underlying structure. To this end, the annular structure being formed rests on a horizontal rotary support 22 comprising an annular turntable 22a having a hub 22b projecting through the center thereof (FIG. 2B). Rotation of the support 22 causes the strip 20 to be wound flat around the hub 22b.

At least one needle board 24 extending horizontally across the width of the strip 12 is disposed radially relative to the vertical axis of the support 22 immediately downstream from the position where the strip 12 comes into contact with the annular structure that is being formed. The needle board is driven in conventional manner with vertical reciprocating motion, during which the needles penetrate into the superposed turns of the structure that is being formed.

Preferably, but not necessarily, needling is performed so as to obtain substantially uniform needling density throughout the volume of the annular structure. To this end, the density per unit area of the needling, i.e. the number of needle strokes per unit area, and the depth of the needling are kept substantially constant. A constant density per unit area is obtained by giving the set of needles 24a on the board 24 the shape of a sector in which the needles are uniformly distributed so as to compensate for the linear path length difference between the inside circumference and the outside circumference of the annular structure as it rotates. Needling to substantially constant depth, preferably extending through a plurality of superposed turns, is obtained by progressively lowering the turntable 22 as winding takes place.

In order to enable the needles 24a to penetrate the required distance into the initial turns of the strip 20 without damaging he beginning of the winding, the turntable 22 is provided with a base covering, e.g. in the form of a polypropylene felt 26 covered in a separation sheet 28 of a plastics material, e.g. an elastomer. The felt 26 enables the needles to penetrate while the sheet 28 prevents most of the fibers coming from the felt 10 passing through, such that the annular structure can easily be removed from the turntable 22.

Feed of the strip 20 is stopped once the annular structure has reached the desired thickness. Finishing needling passes can then be performed by continuing to rotate and possibly also to lower the turntable 22 so that the last-wound turns "see" the same number of needle strokes as the preceding turns, and the annular structure presents constant needling density per unit volume throughout its thickness.

Figure 3A:
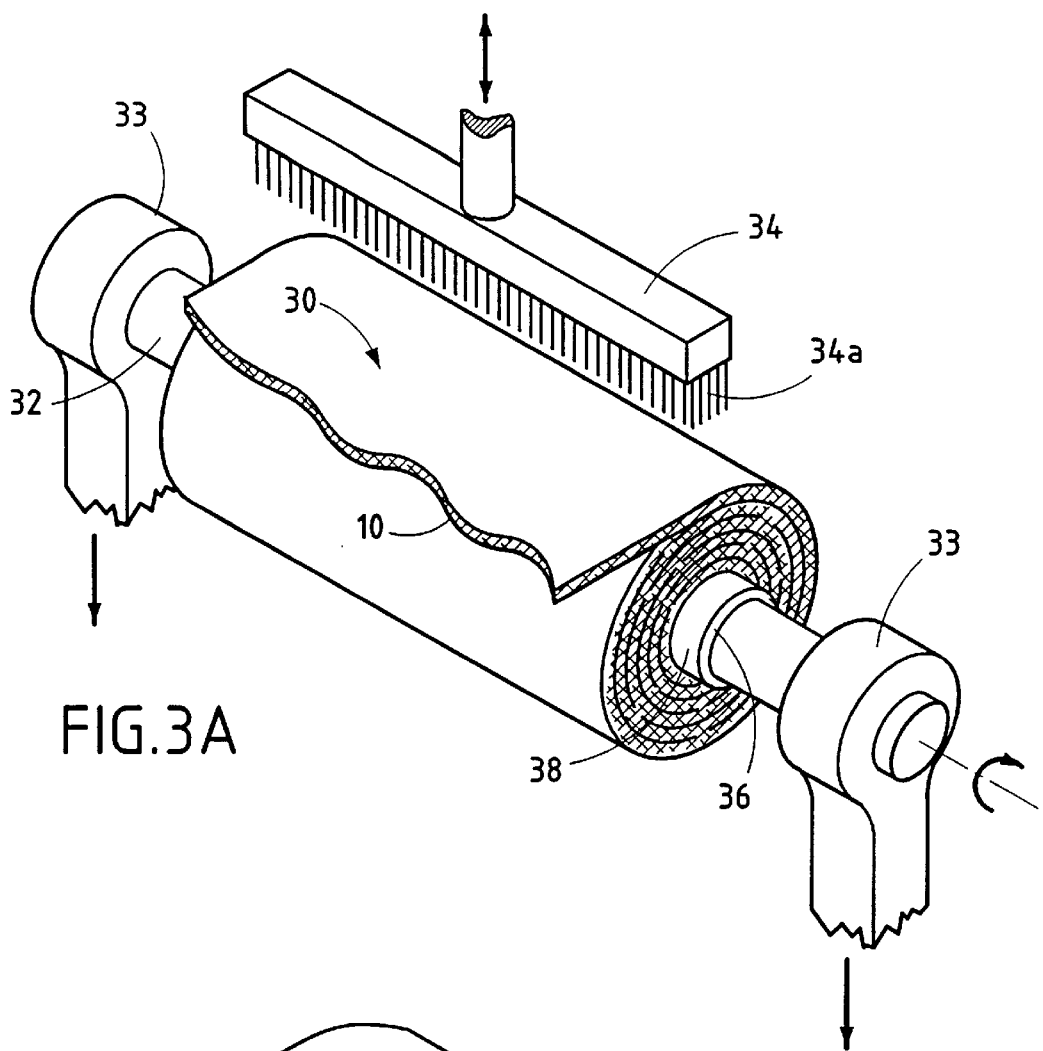
FIGS. 3A and 3B show how a fiber structure is formed in a second implementation of the invention.
Figure 3B:
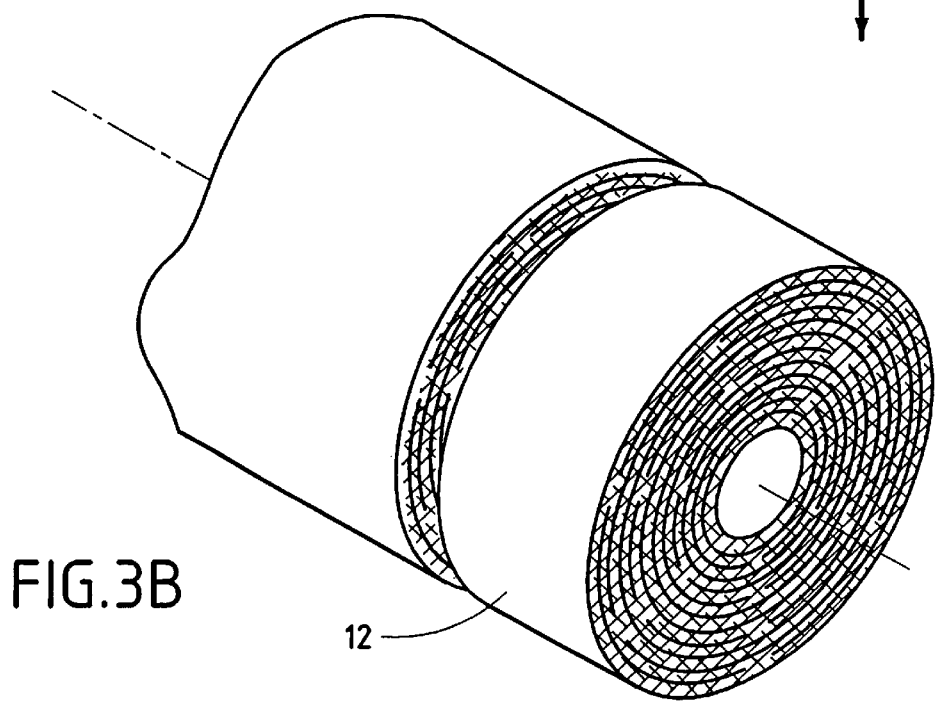

FIGS. 3A and 3B are diagrams showing another method of forming an annular three-dimensional fiber structure.

A strip 30 of felt 10 is wound in superposed layers on a rotary cylindrical mandrel 32 having a horizontal axis, and it is needled while it is being wound.

The mandrel 32 is provided with an annular base covering comprising a felt 36 and a separation sheet 38 similar to those used in the implementation of FIG. 2B. In a variant, the felt strip may be wound on a fixed mandrel that is provided with perforations facing the needles, with winding being achieved by driving the strip in tangential contact with a rotary roller.

Needling is performed by means of a needle board 34 which extends across the width of the strip 30 at a location situated immediately downstream from the position where the strip 30 comes into contact with the layers that have already been wound.

The needles 34a of the board 34 are uniformly distributed along the board so as to obtain needling at constant density per unit area. The depth of needling is kept constant by progressively moving the mandrel 32. Thus, in the example shown, the needle board extends along the top generator line of the sleeve 39 formed by the superposed turns of the strip 30, and the mandrel 32 is carried by a support 33 which is capable of being lowered progressively.

Winding of the strip 30 is interrupted once the thickness of the superposed and needled turns reaches the value corresponding to the radial dimension desired for the annular three-dimensional structure, i.e. to the difference between its inside and outside radii. Finishing needling passes can be performed as described above.

Thereafter, after the resulting needled sleeve has been removed, it can be sliced in radial planes (FIG. 3B), e.g. by water jet cutting, so as to obtain the looked-for annular structures 12. In a variant, slicing may be performed after compression in the axial direction, with the compressed state being held by impregnation using a liquid composite containing a bonding agent, and possibly by carbonization, in which case compressed carbon fiber preforms are obtained ready to be densified.

Figure 4A:
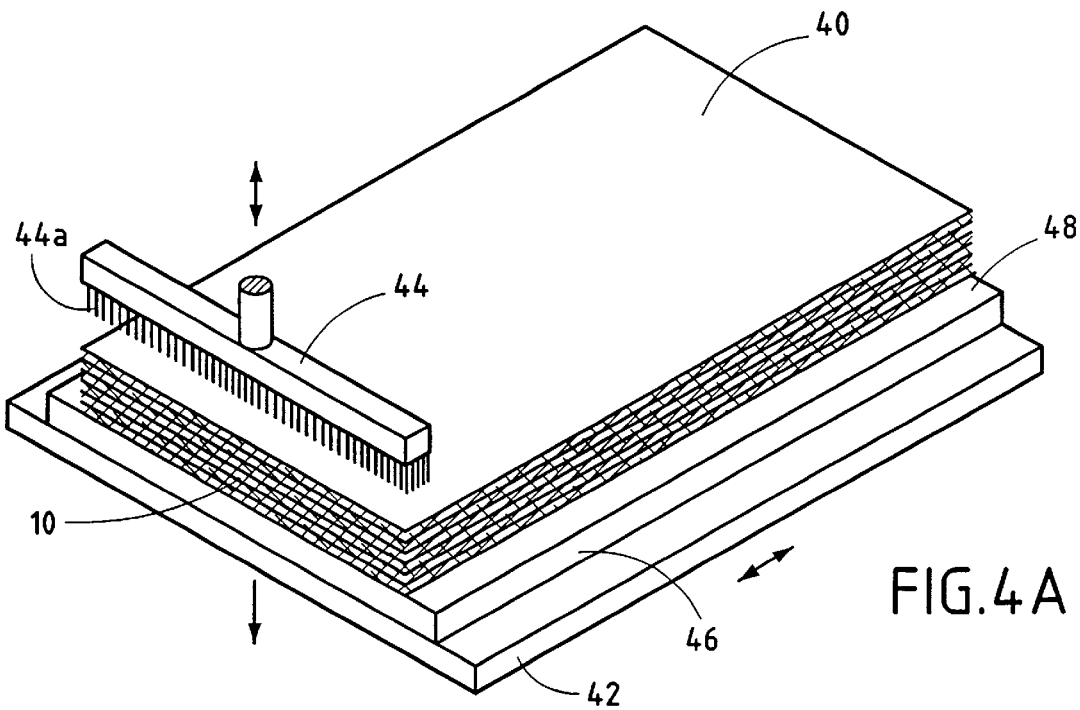
FIGS. 4A and 4B show how a fiber structure is formed in a third implementation of the invention.
Figure 4B:
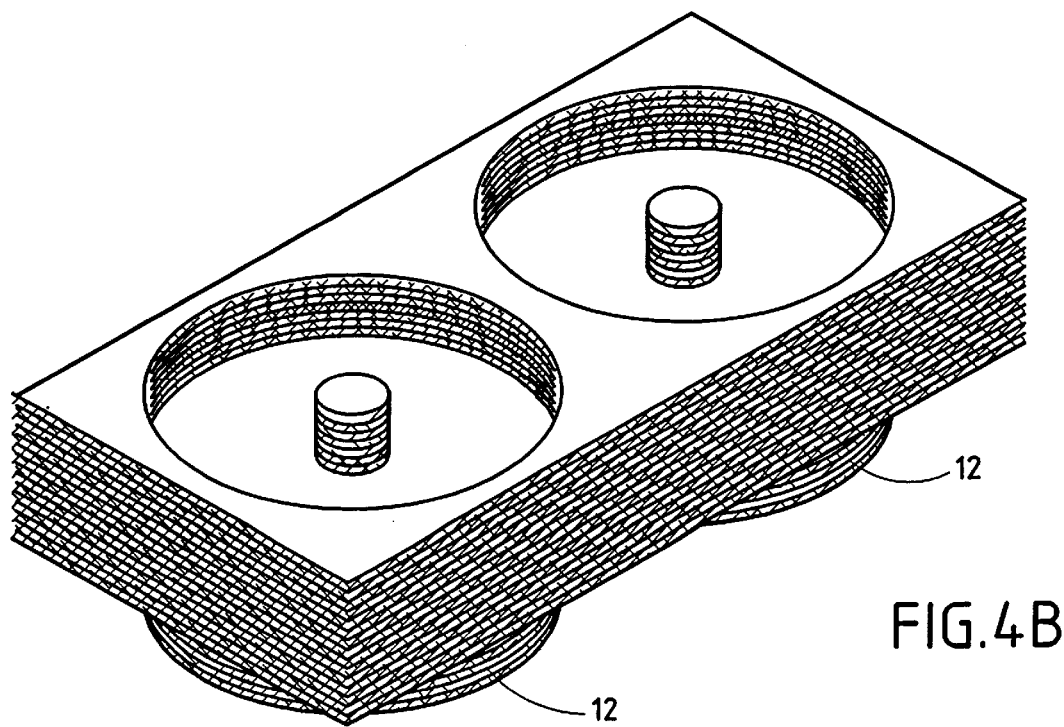

In another implementation shown in FIGS. 4A and 4B, plane plies 40 of felt 10, e.g. rectangular plies, are stacked and needled together as they are being stacked.

The plies rest on a horizontal plane support 42 provided with a base covering having a felt 46 and a separation sheet 48 similar to those used in the implementation of FIG. 2B.

Needling is performed by a needle board 44 which extends horizontally across the width of the plies 40. The needles 44a are uniformly distributed along the board 44. Each time a new ply 40 is added, a needling pass is performed by relative displacement between the needle board 44 and the support 42, and then the support 42 is lowered through a distance corresponding to the thickness of one needled ply, so as to keep the needling depth constant. The relative movement between the needle board 44 and the support 42 can be obtained by moving the board 44 horizontally back and forth over the plies 40. The displacement speed and the needling frequency (frequency of the vertical reciprocating motion of the board 44) are selected to obtain the desired constant density of needling per unit area.

The process is interrupted when the thickness of stacked and needled plies 40 reaches a value corresponding to the thickness desired for the annular three-dimensional structure. Finishing needling passes can then be performed as descried above.

Thereafter, the looked-for three-dimensional structure 12 is obtained by cutting out, e.g. by using a hollow punch on the set of stacked and needled plies 40 (FIG. 4B).

Figure 5A:
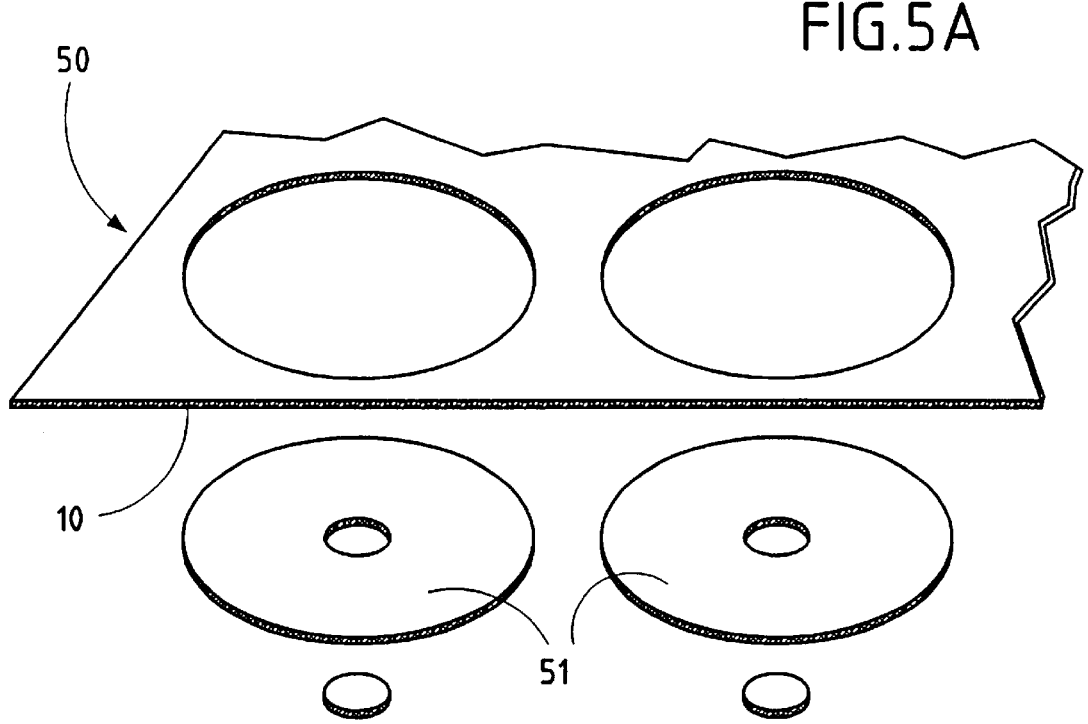
FIGS. 5A and 5B show how a fiber structure is formed in a fourth implementation of the invention.
Figure 5B:
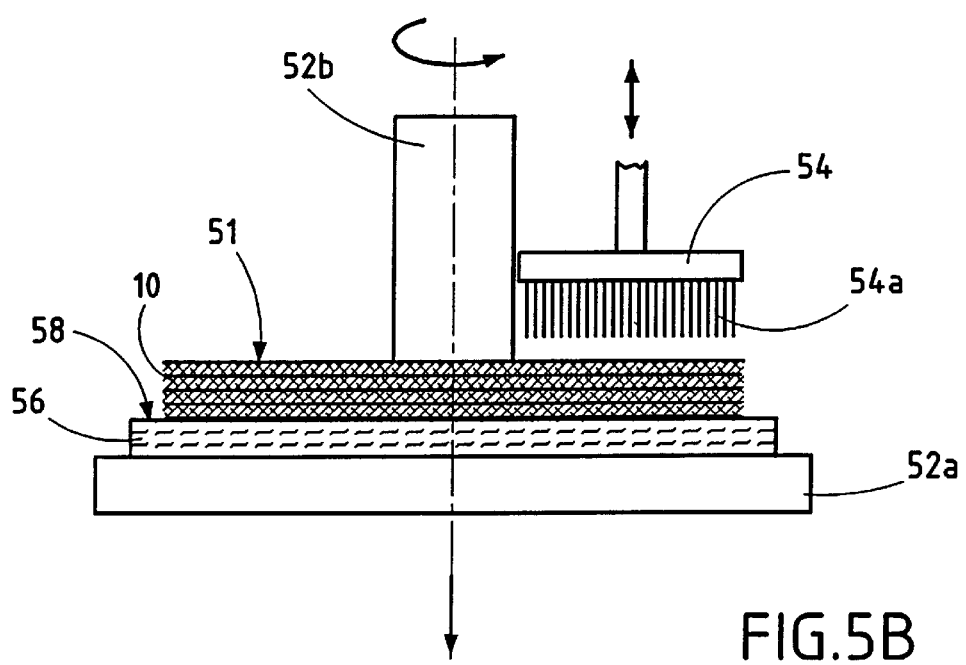

FIGS. 5A and 5B show yet another method of making an annular three-dimensional structure.

In this case, rings 51 having inside and outside diameters corresponding to the inside and outside diameters of the annular structure to be made are cut out from plies 50 of felt (FIG. 5A).

The rings 51 are stacked and needled using an installation similar to that of FIG. 2B. Thus, the rings 51 are stacked on a horizontal annular turntable 52a through which there projects a central hub 52b around which the rings 51 are placed. The turntable 52a is provided with a base covering comprising a felt 56 and a separation sheet 58 similar to those of the implementation of FIG. 2B.

The rings 51 are needled by means of a needle board 54 extending horizontally over a distance corresponding to the radial size of the rings 51. Each ring 51 is needled by rotating the turntable 52a and the needle board 54 relative to each other through one complete turn about the vertical axis of the turntable 52a. Thereafter the turntable 52a is lowered through a distance substantially equal to the thickness of one needled ring. It will be observed that the relative movement between the turntable 52a and the needle board 54 can be obtained by rotating the turntable 52a as in the implementation of FIG. 2B, or by rotating the needle board.

The needles 54a of the board 54 are disposed like those of the board 24, thereby enabling needling of constant density per unit area to be obtained, which in combination with needling to substantially constant depth makes it possible to obtain needling to uniform density in the volume of the resulting three-dimensional annular structure.

Stacking and needling of the rings 51 are interrupted on reaching the thickness desired for the annular three-dimensional structure, and finishing needling passes can be performed as described above. A three-dimensional annular structure is thus obtained directly.

It will be observed that needling to substantially constant density, as performed in the various implementations described above, relies on the principles decried in documents U.S. Pat. No. 4,790,052 and FR-A-2 726 013.

In a variant, the layers of felt need not be needled individually layer by layer, but only after superposing a plurality of layers. Under such circumstances, one or more needling passes are performed each time a predetermined number of layers of felt have been added.

Using layers of felt and bonding them together by needling makes it possible to obtain a structure in which there is no limit on the number of directions in three dimensions in which the fibers are oriented, i.e. a structure is obtained that is genuinely three-dimensional. In addition, the density of needling can be selected so as to transfer a sufficiently large number of fibers in the Z direction (perpendicular to the layers) to ensure that the resulting structure is of a quasi-isotropic character.

Figures 6A, 6B, 6C:
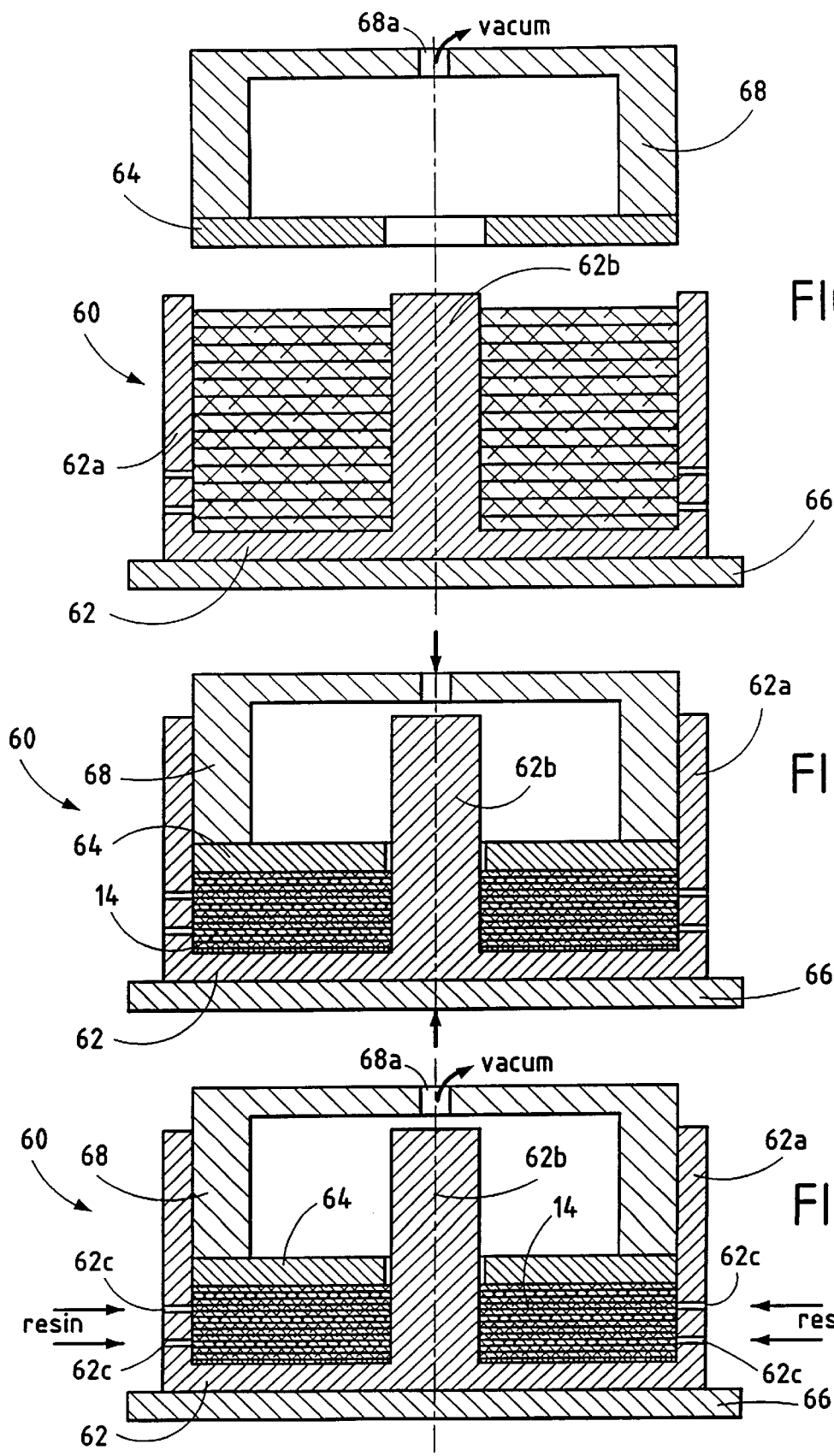
FIGS. 6A to 6C show how a fiber structure is compressed and how the resulting preform is held in the compressed state when implementing a method of the invention.

The annular three-dimensional fiber structures obtained by any of the above methods are compressed by being placed in tooling of the kind shown diagrammatically in FIGS. 6A to 6C.

The tooling used, 60, comprises a bottom mold element 62 and a top mold element 64 connected to respective plates 66 and 68 of a press. A structure 12 that is to be compressed is placed inside the bottom element 62 which has an annular side wall 62a and a central hub 62b between which the structure 12 is received, and between which the annularly shaped top element 64 can be engaged.

Compression is performed by lowering the top mold element 64. The volume of the annular structure 12 is reduced until the desired fiber volume fraction has been reached in the preform. Volume can be reduced in this way by a ratio of as much as two to three so as to obtain a fiber volume fraction of not less than 20%, and preferably equal to 30%. Compression may optionally be assisted by connecting the inside of the tooling to a vacuum source, e.g. via a passage 68a formed through the top wall of the top mold element.

The resulting compressed preform 14 is held in shape by injecting an impregnation composition directly into the tooling 60. The impregnation composition is constituted, for example, by a resin, possibly in solution. A resin is used whose coke content is not zero, for example a phenol resin or a furan resin. Injection is performed through orifices 62c formed through the bottom mold element 62 for example, and it may be assisted by connecting the inside of the tooling to a vacuum source via the passage 68a.

In a variant, injection can be performed in the tooling 60 after the preform has been put into place but before compression. This is preferable when fillers are incorporated in the impregnation composition, thereby reducing its fluidity, it being easier to obtain uniform distribution thereof within the preform when the pores of the preform are more accessible.

After compression, the resin can be polymerized by heating, and the mold elements 62 and/or 64 can be provided with incorporated heater means, e.g. electrical heater resistances. After the resin has polymerized, the consolidated preform 14 is withdrawn from the tooling 60.

Thereafter, carbonization heat treatment is performed on the consolidated preform to carbonize the resin and possibly also to carbonize the fibers of the felt if they are constituted by a carbon precursor and have not previously been transformed into carbon. By way of example, carbonization can be performed at a temperature of about 900° C. under a neutral atmosphere. Carbonization of the resin leaves carbon in the form of a resin coke which bonds together the fibers of the resin preform, thereby ensuring that it retains its shape and is capable of being handled without requiring tooling to hold its shape.

Depending on the coke content, the quantity, and the dilution ratio of the injected resin, the quantity of resin coke obtained can vary from a minimum value necessary for consolidating the preform to a larger value, thereby densifying the preform in part to a substantial extent.

The preform is then densified at least in part, or densification is continued, by chemical vapor infiltration in a manner that is well known per se, causing a matrix of pyrolytic carbon to be deposted in addition to the resin coke. Other known densification techniques can be used, for example the liquid technique or a gas infiltration technique based on vaporizing a liquid precursor in which the heated preform is immersed.

Preferably, the layers of felt are compressed and then consolidated and the fiber preform is densified in such a manner as to obtain a C—C composite disk having, by volume, about 25% to 30% fibers, about 15% to 20% resin coke, about 35% to 45% pyrolytic carbon, and about 15% to 20% residual porosity.

The resulting C—C composite disk 16 is machined to its final dimensions. It comprises a core 16a (FIG. 1) with a friction portion 16b situated on one side or on both sides of the core depending on whether it is a disk having one friction face or two. Notches (not shown) are formed along the inside or outside periphery of the core so as enable the disk to be connected mechanically to the member with which it is constrained to rotate.

It will be observed that making an annular three-dimensional structure from a base fiber fabric constituted by a felt is less costly than when using a woven cloth or laminates of unidirectional sheets which are more expensive to make, with this being true particularly when there is little or no cutting waste. In addition, impregnating with a resin makes it possible both to consolidate the preform, and thus to make do without support tooling during chemical vapor infiltration, and to form a portion of the carbon matrix, thereby reducing the remaining time required for densification.

The fiber reinforcement of the disk, constituted by the preform, can be made of fibers that are all of the same kind, or that are of different kinds. High-strength carbon fibers are preferably used for the portion of the preform corresponding to the core of the disk since it is the core which transmits friction forces. High-strength carbon fibers are constituted, in particular, by fibers having a pre-oxidized polyacrylonitrile precursor or an anisotropic pitch precursor. As already mentioned, low-modulus carbon fibers can be used instead, at least in part, for the, or each, portion of the preform corresponding to the, or each, friction portion of the disk, so as to reduce transverse stiffness. Low-modulus carbon fibers are in particular fibers having a phenol precursor, or a cellulose precursor, or an isotropic pitch precursor.

To obtain fiber reinforcement with carbon fibers across the thickness of the disk coming from different precursors, it is preferable to make the fiber preforms by compressing annular structures formed from stacked plies as in the implementations of FIGS. 4A & 4B and 5A & 5B. The initial and/or final plies in the stack which correspond to the, or each, friction portion of the disk are then made using a felt of a composition that is different from that forming the intermediate plies which correspond to the core of the disk.

By way of example, the initial and/or final stacked plies of felt can be made of a mixture of carbon or carbon precursor fibers based on pre-oxidized polyacrylonitrile (PAN) and based on phenol, while the felt used for the intermediate plies is made of carbon or carbon precursor fibers based on pre-oxidized polyacrylonitrile.

EXAMPLE 1

A two friction face brake disk for a motor vehicle brake was made by stacking flat and successively needling thirty-two layers of felt made of pre-oxidized PAN fibers and having a fiber fraction equal to about 21%. Each layer of felt was about 5 mm thick in the relaxed state (prior to needling and compression).

The layers of felt were needled together one by one with substantially constant needling depth as described in document FR-A-2 584 106 or FR-A-2 726 013, thereby obtaining a fiber structure having substantially constant needling density per unit volume. It was then carbonized to transform the precursors of the fibers into carbon. After carbonization at about 1600° C., the fiber fraction was equal to about 12%.

The resulting carbon fiber structure was cut up into rings having inside and outside diameters respectively equal to 180 mm and 360 mm, as shown in the implementation of FIG. 4B. The structure was compressed in a mold to reduce its volume by a ratio of about 2.3 times so as to obtain a thickness of 28 mm, thereby bringing the fiber volume fraction to about 29%, and it was held in that shape by injecting a phenol resin in an aqueous solution, and then polymerizing the resin. The preform was removed from the mold and then subjected to heat treatment to carbonize the resin. The quantity of phenol resin that was inserted was determined so as to obtain a resin coke occupying about 25% of the volume of the consolidated preform, and the apparent density of the consolidated preform was about 0.9 g/cm$^3$. Densification was continued by chemical vapor infiltration until the pyrolytic carbon deposited inside the consolidated preform represented about 36% by volume, leaving residual porosity of about 10% by volume. It should be observed that it was possible to carbonize the phenol resin while raising its temperature in preparation for the densification process.

The resulting C—C composite disk had density equal to 1.65 g/cm$^3$. It was friction tested on a test bench using brake pads likewise made of C—C composite. The brake pads were manufactured by densifying a preform made by overneedling sheets of phenol precursor carbon fibers, where the overneedling was performed so as to obtain a fiber volume fraction of about 50%.

The tests performed show remarkable stability of braking torque together with regular and moderate wear, giving rise to no undesirable vibration.

EXAMPLE 2

The procedure was the same as in Example 1, but flat stacking and needling was applied successively to twenty-three layers of felt made of pre-oxidized PAN precursor fibers.

After its fibers had been carbonized and it had been cut into rings, the preform was compressed to reduce its volume by a ratio of about 1.8 times down to a thickness of 22 mm, and a fiber volume fraction of about 23%. Phenol resin impregnation was performed so that after the resin had been polymerized and carbonized, a consolidated preform was obtained having a coke content of about 40% and an apparent density of about 1 g/cm$^3$.

The consolidated preform was then densified by pyrolytic carbon deposited by chemical vapor infiltration until the pyrolytic carbon constituted about 27% by volume, leaving residual porosity of about 10% by volume. The final density was about 1.6 g/cm$^3$. The resulting disk was tested under conditions similar to those of Example 1. Good stability of braking torque and lack of undesirable vibration were again observed.

EXAMPLE 3

The procedure was the same as in Example 1, except that after needling, but before compression, the preform was impregnated by sucking in a dilute solution of phenol resin. Thereafter the solvent was allowed to evaporate (ethanol solvent) and then the preform was compressed in the mold. The remainder of the process was unchanged.

The quantity of phenol resin that was inserted and the compression were such that the resulting consolidated and carbonized preform had a fiber fraction of 25% and a coke content of 15%, leaving 60% porosity by volume and an apparent density of 0.67 g/cm$^3$.

Densification by chemical vapor infiltration was performed until the deposited pyrolytic carbon represented about 50% by volume, leaving residual porosity of about 10% and leading to a density of about 1.73 g/cm$^3$. The tests performed thereafter gave entire satisfaction both concerning stability of braking torque and absence of undesirable vibration.

EXAMPLE 4

A needled fiber structure was made as in Example 1. Several samples were cut off. Each sample was placed in tooling and a furan resin was injected into the tooling, prior to compression. Compression was performed cold and then the preform was held under pressure and the resin cross-linked with the temperature being raised to about 150° C.

Once consolidated in this way the preform was subjected to heat treatment at a temperature of about 900° C. to transform the resin into carbon. Carbon matrix densification was then completed by chemical vapor infiltration.

The following table gives values for coke content, pyrolytic carbon content (PyC) obtained by chemical vapor infiltration, final density, final porosity, and breaking stress in (MPa) for various samples compressed under different pressures giving, after compression, fiber fractions respectively equal to 20%, 35%, and 30%. The table shows the influence of fiber fraction on measured stress.

| Fiber fraction (%) | Coke content (%) | PyC content (%) | Final density (g/cm³) | Final porosity (%) | Stress MPa |
|---|---|---|---|---|---|
| 20 | 13 | 44 | 1.45 | 23 | 35 |
| 25 | 15 | 41 | 1.50 | 19 | 40 |
| 30 | 13 | 40 | 1.54 | 17 | 60 |

EXAMPLE 5

A needled fiber structure was made as in Example 1. Several samples were cut off. Each sample was placed in tooling, and compressed to obtain a fiber volume fraction equal to about 30%.

After compression, a phenol resin was injected into the tooling. Different samples were used, varying the dilution of the phenol resin in water. The impregnated preform was consolidated by polymerizing the resin, then removed from the tooling to be subjected to heat treatment for carbonizing the resin. Densification by means of a carbon matrix was finished off by chemical vapor infiltration. The table below gives values for coke content, pyrolytic carbon content, density, and measured porosity.

| Resin dilution (volume %) | Fiber fraction (%) | Coke content (%) | PyC content (%) | Final density (g/cm³) | Final porosity (%) |
|---|---|---|---|---|---|
| 0 | 30 | 32 | 23 | 1.36 | 15 |
| 20 | 30 | 27 | 28 | 1.47 | 15 |
| 40 | 30 | 23 | 32 | 1.50 | 15 |

This table shows that it is possible to adjust the respective quantities of resin coke and of pyrolytic carbon within the matrix.

EXAMPLE 6

The procedure was as in Example 3 except that the fiber structure was obtained by stacking and needling the following in succession:

10 layers of felt made up of 70% by volume of carbon precursor fibers constituted by pre-oxidized PAN and 30% by volume of carbon precursor fibers of the phenol type ("Kynol");

12 layers of felt made of pre-oxidized PAN fibers; and 10 layers of felt identical to those constituting the first 10 layers.

Bench tests performed on the resulting disk showed remarkable stability for its braking torque and complete absence of undesirable vibration, which was contributed to by the presence of low-modulus carbon fibers in the wear portions of the disk adjacent to its friction faces.

What is claimed is:

1. A method of manufacturing a part made of carbon—carbon composite material, the method comprising forming a three-dimensional fiber structure, compressing the fiber structure to obtain a fiber preform of shape close to that of the part to be manufactured, holding the preform in its compressed state, and densifying the preform, the method being characterized in that:

the three-dimensional fiber structure is formed by superposing layers of felt and by bonding them together by needling; then the fiber structure is compressed so as to obtain a preform having a fiber volume fraction of not less than 20%; and the preform is held in its compressed state by injecting a liquid composition inside a tooling in which the preform is compressed, said liquid composition containing a bonding agent capable of bonding together the fibers of the preform.

2. A method according to claim 1, characterized in that the three-dimensional fiber structure is formed by superposing and needling felt layers having a fiber volume fraction lying in the range 7% to 15%.

3. A method according to claim 1, characterized in that the three-dimensional fiber structure is formed by superposing and needling layers of felt constituted by fibers having a mean length lying in the range 10 mm to 100 mm.

4. A method according to claim 1, characterized in that the layers of felt are needled as they are superposed.

5. A method according to claim 4, characterized in that each layer of felt is needled, and the number of needle strokes per unit area and the penetration depth of the needles in the fiber structure being formed are controlled so as to obtain needling of predetermined density in the thickness of the fiber structure.

6. A method according to claim 5, characterized in that the number of needle strokes per unit area and the penetration depth of the needles are controlled so as to obtain constant needling density through the entire thickness of the fiber structure, thereby imparting a quasi-isotropic character thereto.

7. A method according to claim 1, characterized in that the fiber structure is impregnated with a liquid composition prior to being compressed.

8. A method according to claim 1, characterized in that the fiber structure is impregnated with a liquid composition after being compressed.

9. A method according to claim 1, characterized in that the holding of the preform in the compressed state comprises impregnating the preform with a liquid composition containing a resin.

10. A method according to claim 9, characterized in that a resin is used having a non-zero coke content, and the resin is carbonized by heat treatment performed on the preform prior to densification thereof by chemical vapor infiltration.

11. A method according to claim 1, for manufacturing an annular part out of carbon—carbon composite material, the method being characterized in that an annular three-dimensional fiber structure is formed by winding a strip of felt into superposed layers that are bonded by needling.

12. A method according to claim 11, characterized in that a deformable felt strip is wound helically in flat turns.

13. A method according to claim 12, characterized in that a strip of felt is used that is provided with V-shaped notches in one of its sides that is designed to constitute the inside circumference of the annular structure.

14. A method according to claim 11, characterized in that a strip of felt is wound in superposed layers on a cylindrical mandrel.

15. A method according to claim 14, characterized in that a cyclical sleeve is formed by winding a strip of felt in superposed layers on a cylindrical mandrel, and the layers are bonded to one another by needling, and the sleeve is sliced in planes perpendicular to its axis to obtain annular three-dimensional structures.

16. A method according to claim 1, for manufacturing an annular part, the method being characterized in that an annular three-dimensional fiber structure is formed by stacking flat plies of felt and by bonding the plies to one another by needling.

17. A method according to claim 16, characterized in that full plies are used and in that the annular structure is obtained by cutting out after the plies have been stacked and needled.

18. A method according to claim 16, characterized in that annular plies are used that have been cut out previously.

19. A method according to claim 18, characterized in that the fibers coming from the waste of cutting out plies are used to form the felt.

20. A method according to claim 1, characterized in that a felt is used that is made of carbon precursor fibers and the carbon precursor is transformed by heat treatment applied to the needled preform.

21. A method according to claim 1, characterized in that at least one felt is used made of carbon or carbon precursor fibers based on pre-oxidized polyacrylonitrile, or based on phenol, or based on cellulose, or based on isotropic pitch, or based on anisotropic pitch.

22. A method according to claim 21, characterized in that at least one felt is used made of carbon fibers coming from different precursors, or made of different carbon precursor fibers.

23. A method according to claim 1, characterized in that fibers of different kinds are used for different portions of the fiber structure.

24. A method according to claim 23, for manufacturing a brake disk having a core and at least one friction portion on one side of the core, the method being characterized in that a felt is used made of carbon or carbon precursor fibers based on pre-oxidized polyacrylonitrile or based on anisotropic pitch for the portion of the structure corresponding to the core of the disk, and a felt is used comprising at least some carbon or carbon precursor fibers based on phenol or on cellulose or on isotropic pitch for the, or each, portion of the structure corresponding to a friction portion of the disk.

25. A method of manufacturing a part made of carbon—carbon composite material, the method comprising forming a three-dimensional fiber structure, compressing the fiber structure to obtain a fiber preform of shape close to that of the part to be manufactured, holding the preform in its compressed state, and densifying the preform, the method being characterized in that:

the three-dimensional fiber structure is formed by superposing and needling layers of felt constituted by fibers having a mean length lying in the range 10 mm to 100 mm, said felt having a fiber volume fraction lying in the range 7% to 15%;

the layers of felt are needled as they are superposed;

each layer of felt is needled, and the number of needle strokes per unit area and the penetration depth of the needles in the fiber structure being formed are controlled so as to obtain needling of predetermined density in the thickness of the fiber structure;

the number of needle strokes per unit area and the penetration depth of the needles are controlled so as to obtain constant needling density through the entire thickness of the fiber structure, thereby imparting a quasi-isotropic character thereto;

the fiber structure is impregnated with a liquid composition, said impregnation being one of prior to being compressed and after being compressed; then the fiber structure is compressed so as to obtain a preform having a fiber volume fraction of not less than 20%;

the preform is held in the compressed state by injecting the liquid composition containing the bonding agent inside tooling in which the preform is compressed said bonding agent capable of bonding together the fibers of the preform;

the holding of the preform in the compressed state comprises impregnating the preform with a liquid composition containing a resin; and a resin is used having a non-zero coke content, and the resin is carbonized by heat treatment performed on the preform prior to densification thereof by chemical vapor infiltration.

26. A method according to claim 25, for manufacturing an annular part out of carbon—carbon composite material, the method being characterized in that:

an annular three-dimensional fiber structure is formed by winding a strip of felt into superposed layers that are bonded by needling;

a deformable felt strip is wound helically in flat turns; and a strip of felt is used that is provided with V-shaped notches in one of its sides that is designed to constitute the inside circumference of the annular structure.

27. A method according to claim 26, characterized in that:

a strip of felt is wound in superposed layers on a cylindrical mandrel; and a cyclical sleeve is formed by winding a strip of felt in superposed layers on a cylindrical mandrel, and the layers are bonded to one another by needling, and the sleeve is sliced in planes perpendicular to its axis to obtain annual three-dimensional structures.

28. A method according to claim 25, for manufacturing an annular part, the method being characterized in that:

an annular three-dimensional fiber structure is formed by stacking flat plies of felt and by bonding the plies to one another by needling;

the annular structure is obtained by one of using full plies that are cut out and needled after the plies have been stacked and annular plies that have been cut out previously;

a felt is used that is made of carbon precursor fibers and the carbon precursor is transformed by heat treatment applied to the needles preform;

at least one felt is used made of carbon or carbon precursor fibers based on pre-oxidized polyacrylonitrile, or based on phenol, or based on cellulose, or based on isotropic pitch, or based on anisotropic pitch and at least one felt is used made of carbon fibers coming from different precursors, or made of different carbon precursor fibers; and fibers of different kinds are used for different portions of the fiber structure.

29. A method according to claim 28, for manufacturing a brake disk having a core and at least one friction portion on one side of the core, the method being characterized in that a felt is used made of carbon or carbon precursor fibers based on pre-oxidized polyacrylonitrile or based on anisotropic pitch for the portion of the structure corresponding to the core of the disk, and a felt is used comprising at least some carbon or carbon precursor fibers based on phenol or on cellulose or on isotropic pitch for the, or each, portion of the structure corresponding to a friction portion of the disk.

* * * * *